H. JUNKE.
TURBINE.
APPLICATION FILED APR. 14, 1915.
1,171,791.
Patented Feb. 15, 1916.
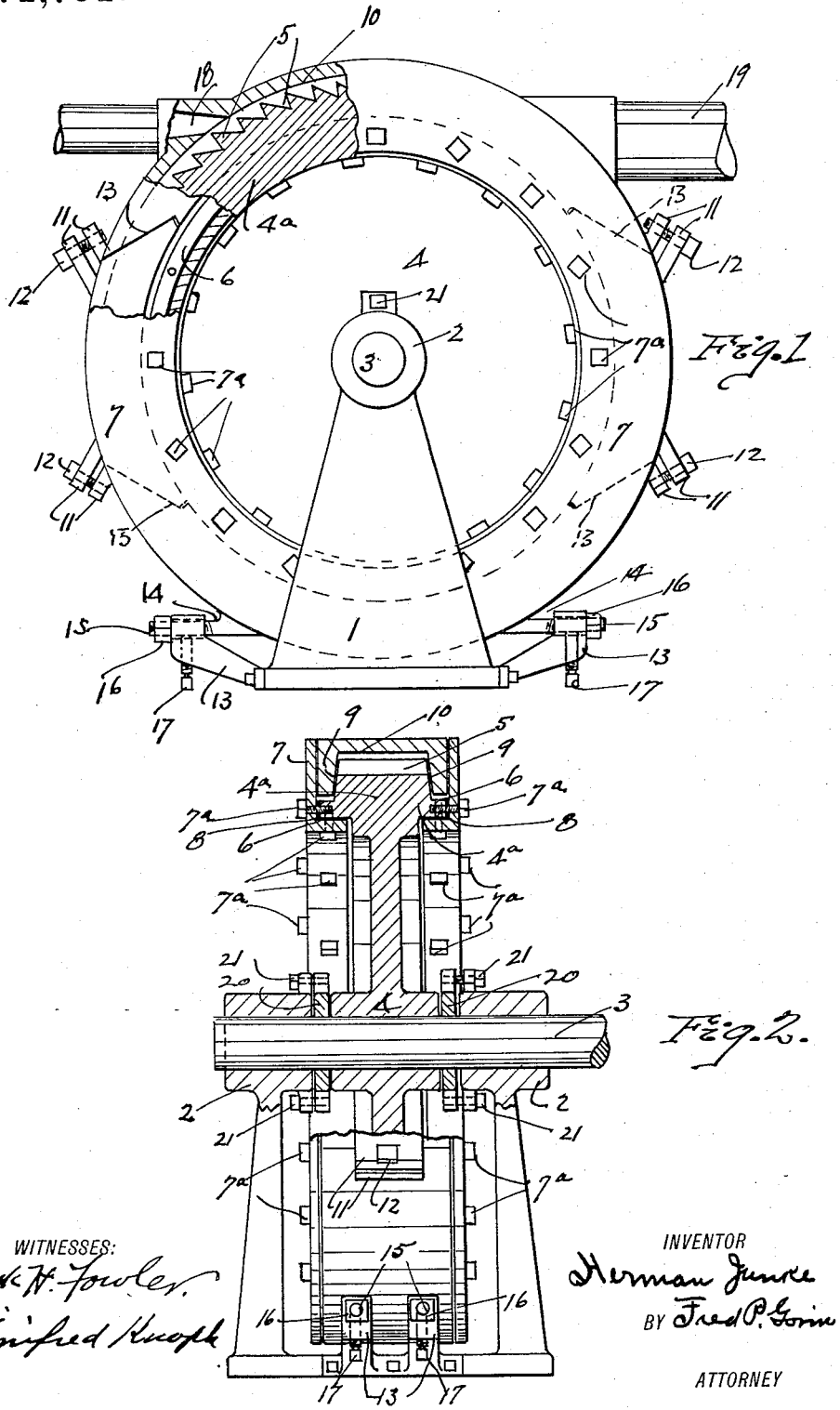
WITNESSES:
INVENTOR
Herman Junke
BY Fred P. Gorin
ATTORNEY

UNITED STATES PATENT OFFICE.

HERMAN JUNKE, OF SEATTLE, WASHINGTON.

TURBINE.

1,171,791. Specification of Letters Patent. Patented Feb. 15, 1916.

Application filed April 14, 1915. Serial No. 21,373.

*To all whom it may concern:*

Be it known that I, HERMAN JUNKE, a citizen of the United States, and a resident of Seattle, in the county of King and State of Washington, have invented certain new and useful Improvements in Turbines, of which the following is a specification.

My invention relates to turbines, and has for its principal objects, to provide a turbine having novel means for adjusting the clearances between the runner and housing; to provide simplified means of assembling the turbine.

Other objects will appear as my invention is more fully described in the following specification, illustrated in the accompanying drawings and pointed out in the appended claim.

In the drawings, Figure 1 is a side elevation of my device with parts broken away. Fig. 2 is an end elevation of same with parts broken away.

In the drawings, numeral 1 designates a frame having bearings 2, in which is mounted a shaft 3. A circular turbine runner 4 is secured to shaft 3, said runner having buckets 5 at its outer edge. The buckets 5 may be of any approved shape. Rim 4ª of runner 4 terminates in annular flanges 6 to which are secured casing members 7 by means of bolts 7ª. Gaskets 8 may be inserted between flanges 6 and casing members 7. The outer part of rim 4ª and buckets 5 have their edges tapered uniformly as at 9, said tapers being adapted to fit into corresponding internal tapers within a housing 10. The housing 10 is of such shape as to fit closely over the buckets 5 and also between casing members 7. Housing 10 is cut into a suitable number of segments as shown in Fig. 1, which are provided with lugs 11 and screws 12. The various segments of housing 10 are cut on an angle as at 13 in such a way as to form a sliding joint. Adjustment of clearance and wear between rim 4ª and housing 10 is made by means of the screws 12 which draw the various segments of housing 10 closer to rim 4ª and buckets 5. The housing 10 is supported from brackets 13 outstanding from frame 1. Supports 14 of housing 10 terminate in screw ends 15 having nuts 16, said screws and nuts forming a means of adjusting the alinement of housing 10 with respect to the runner. The lateral adjustment by means of screw ends 15 and nuts 16, allows a slight movement of the housing 10 and an accurate alinement of said housing with respect to the runner. It will be understood that the holes in the brackets are not threaded and are somewhat larger than the screws 15. Additional screws 17 also assist in adjusting the vertical alinement. The screws 17 are secured into brackets 13 and project into the holes for screw ends 15. Screw ends 15 may be raised in their holes by the action of screws 17 which bear against them from beneath. The operating fluid enters through intake 18, strikes against buckets 5, causing runner 4 to rotate. The operating fluid having expended much of its energy, flows out through exhaust port 19. It will be noted that housing 10 may be readily adjusted or removed by adjusting or removing bolts 12. Likewise casing members 7 may be removed without affecting the adjustment of housing 10, by removing bolts 7ª. Adjusting rings 20, which are held by adjusting screws 21, serve to control the lateral position of the runner 4 with respect to the bearings 2.

It is obvious that many minor changes in construction and operation within the scope of the appended claim will suggest themselves to anyone skilled in the art, and I therefore, do not wish to be limited to the exact form and construction shown.

What I claim as new and desire to protect by Letters Patent, is—

In a turbine, the combination with the main frame, of a segmental housing, the ends of each of the segments having a sliding joint with its adjacent segments, a lug on each end of each segment and a screw passing through each pair of abutting lugs, whereby the housing may be drawn down upon the runner of the turbine or forced away from it, brackets upon the main frame and projections from the housing which slidably pass through the said brackets, the said projections terminating in screw ends, whereby the housing is adjustable horizontally with respect to the frame, and additional screws for adjusting the housing vertically with respect to the frame.

HERMAN JUNKE.

Witnesses:
FRED P. GORIN,
WINIFRED KNAPP.